United States Patent [19]
Kadano et al.

[11] Patent Number: 5,133,927
[45] Date of Patent: Jul. 28, 1992

[54] GRID FOR NUCLEAR FUEL ASSEMBLY

[75] Inventors: Hiroaki Kadano; Akio Obiuchi; Koichi Tominaga, all of Ibaraki, Japan

[73] Assignee: Mitsubishi Nuclear Fuel Co., Tokyo, Japan

[21] Appl. No.: 619,973

[22] Filed: Nov. 30, 1990

[30] Foreign Application Priority Data

Dec. 6, 1989 [JP] Japan .................. 1-316933

[51] Int. Cl.⁵ ................................. G21C 3/34
[52] U.S. Cl. ..................... 376/462; 376/438; 376/441
[58] Field of Search ............. 376/438, 462, 441, 261

[56] References Cited

U.S. PATENT DOCUMENTS

| | | | |
|---|---|---|---|
| 3,791,466 | 2/1974 | Patterson et al. | 376/442 |
| 3,920,516 | 11/1975 | Kmonk et al. | 376/441 |
| 4,692,303 | 9/1987 | Osborne | 376/446 |
| 4,772,447 | 9/1988 | Manson et al. | 376/441 |
| 4,800,061 | 1/1989 | Shallenberger et al. | 376/261 |
| 4,873,051 | 10/1989 | Duncan et al. | 376/438 |
| 4,888,152 | 12/1989 | Razafindrazaka | 376/462 |

Primary Examiner—Brooks H. Hunt
Assistant Examiner—Menna Chelliah
Attorney, Agent, or Firm—Oblon, Spivak, McClelland, Maier & Neustadt

[57] ABSTRACT

There is disclosed a grid in a nuclear fuel assembly for supporting fuel rods and thimbles, which includes a plurality of elongated straps intersecting perpendicularly with each other to define a plurality of grid cells. A plurality of engaging units are provided on the grid cells for supporting thimbles, respectively. Each engaging unit includes at least one engaging member provided on at least one of the opposite ends of the straps of the grid cell and defining an engaging portion. A plurality of cylindrical sleeves are arranged in the grid cells for supporting thimbles, respectively. Each sleeve has at least one engaging projection associated with the engaging portion of the engaging member. The engaging projection of the sleeve and the engaging portion of the engaging member are formed such that when the sleeve is turned circumferentially, the engaging projection is held in engagement with the engaging portion.

8 Claims, 6 Drawing Sheets

GRID FOR NUCLEAR FUEL ASSEMBLY

BACKGROUND OF THE INVENTION

1. Field of the Invention

The present invention relates to a grid in a nuclear fuel assembly for supporting a plurality of fuel rods, control-rod guide thimbles and so on.

2. Prior Art

FIG. 5 of the attached drawings depicts an example of a nuclear fuel assembly which is mounted on a nuclear reactor such as a pressurized water reactor or the like.

In this assembly, a pair of top and bottom nozzles 1 and 2 are arranged in vertically spaced relation so as to face each other. A plurality of zircaloy guide thimbles 3 such as control-rod guide thimbles and measuring-instrument guide thimbles are extended between and securely fixed to the top and bottom nozzles 1 and 2, and a plurality of grids 4 are secured to intermediate portions of these guide thimbles 3 in vertically spaced relation to each other.

As shown in FIGS. 6 and 7, each of the grids 4 includes a plurality of straps 6 assembled perpendicularly to each other to define a plurality of grid cells 5. A pair of dimples 9 and a pair of springs 10 for supporting a fuel rod 8 are formed on the wall surfaces 6a of the straps of each grid cell 5 in opposed relation to each other. Furthermore, a plurality of sleeves 11 are securely fixed to the upper and lower opening ends of prescribed grid cells 5, respectively, for guiding the outer peripheries of the thimbles 3 to be inserted into the grid cells 4.

Each sleeve 11 is of an elongated cylindrical shape having an inner diameter generally identical to the intervening distance between the opposite straps of the grid cell 5, and as shown in FIG. 8, four openings 12 are formed in an outer peripheral surface 11a thereof in circumferentially equally spaced relation to one another, whereby four wall portions 11b are defined at the central portion thereof. For securing each sleeve 11 to a prescribed grid cell 5, the sleeve 11 is first inserted into the grid cell 5 through the upper or lower opening end in such a manner that its wall portions 11b are opposed to the corner portions 5a of the grid cell 5, and that the opposite ends of the sleeve 11 protrude from the upper and lower opening ends of the grid cell 5, and is then fixedly secured to the grid cell 7 by means of brazing or the like.

In the aforesaid grid 4, when inserted into the grid cell 5, the fuel rod 8 is caused to move while its outer peripheral surface is being clamped between the dimples 9 and the springs 10. Hence, there is a problem that the outer peripheral surface of the fuel rod 8 is scratched by the springs 10 and the dimples 9 along its longitudinal direction.

Therefore, a grid cell 20 of a construction as shown in FIGS. 9 and 10 is employed. In this grid 20, each of the elongated straps 21 has a plurality of cut-outs 22 formed therein so as to be spaced a predetermined distance from each other in a longitudinal direction of the strap 21, and a spring 24 is formed between each pair of adjacent cut-outs 22 in the strap 21 so as to project into a grid cell 23. In addition, a pair of dimples 26 are formed at respective position in the widthwise direction of the strap 21, between which the spring 24 is located in such a manner as to project in a direction opposite tot he spring 24.

For inserting a plurality of fuel rods 36 into the grid cells 23 in each of the grids 20, respectively, a deflecting jig 15 as shown in FIG. 11 is employed. This deflecting jig 15 is composed of a sleeve 33 divided circumferentially into four sleeve pieces and a tapered pin 34 inserted into the sleeve 33 for axial sliding movement, and is first inserted into the grid cell 23. Then, the tapered pin 34 is drawn into the sleeve 33 to cause the four-divided sleeve pieces to be urged and moved outwardly, so that the springs 24 are deflected by these pieces as shown in FIG. 10. Then, an elongated key member 16 is inserted into a cut-out 27 from the side of the grid 20 to bring its hook 31 into engagement with a rib 25 of the strap, and while the spring 24 is maintained deflected by the key member 30, the deflecting jig 15 is released. Thereafter, the fuel rod 36 is inserted, and the key member 30 is released. Thus, with these procedures, the fuel rod 36 is not brought into sliding contact with the springs 24 and the dimples 26 during the insertion, so that no scratches occur on the outer peripheral surface of the fuel rod 36.

However, in the case where the grid 20 of the aforesaid construction is employed, the conventional sleeve 11 as described above cannot be utilized. This is because when the sleeve 11 is secured to the grid cell 23, the wall portion 11b of the sleeve 11 prevents the hook 31 of the key member 16 from engaging with the rib 25 of the strap 21 in the grid 20.

In order to overcome the above problems, a short sized sleeve 40 as shown in FIG. 12 may be used. This sleeve 40 is prepared by cutting a central periphery of the sleeve 11 of FIG. 8 by a width A in a circumferential direction to divide the sleeve 11 transversely into two short parts. The short sleeve 40 thus prepared can be inserted into the grid cell 23 with its four short legs 40a being opposed to the corner portions of the grid cell 23, and besides the hook 31 can be easily engaged with the rib 25 by inserting the key member 10 into the space of the width A in the corner portion of the grid cell 23.

However, there is still a problem that when securing the short sleeve 40 to the grid cell 23, the short sleeve 40 may be shifted from the axis of the grid cell 23, and hence the thimbles 3 cannot be arranged properly. Moreover, the surface areas that can be used for brazing the short legs 40a of the sleeve 40 to the wall surfaces of the straps 21 of the grid cell 23 are relatively small, and hence the securing strength of the short sleeve 40 with respect to the grid 20 is unduly reduced.

SUMMARY OF THE INVENTION

It is therefore an object of the present invention to provide a grid in a nuclear fuel assembly, in which when a short sleeve is employed to permit the use of the deflecting jig and the key member, the short sleeve can be easily secured to the opening ends of the grid cell properly.

According to the present invention, there is provided a grid in a nuclear fuel assembly for supporting fuel rods and thimbles, comprising:

a plurality of elongated straps intersecting perpendicularly with each other to define a plurality of first grid cells for supporting the fuel rods and a plurality of second grid cells for supporting the thimbles, each of the grid cells having a prescribed intervening distance defined between a pair of the opposed straps, those portions of the straps defining a respective grid cell having opposite ends defining opposite opening ends of the grid cell;

a plurality of engaging means each provided on a respective one of the second grid cells, each of the engaging means including at least one engaging member provided on at least one of the opposite ends of the straps of the second grid cell and defining an engaging portion; and a plurality of cylindrical sleeves each arranged in a respective one of the second grid cells and having an inner diameter generally identical to the intervening distance, each of the sleeves having at least one engaging projection associated with the engaging portion of the engaging member, the engaging projection of the sleeve and the engaging portion of the engaging member being formed such that when the sleeve is turned circumferentially, the engaging projection is held in engagement with the engaging portion.

In the foregoing, when the sleeve is inserted in the second grid cell and turned circumferentially, engaging projection of the sleeve can be held in engagement with the engaging portion of the engaging member. Therefore, in the grid of the invention, the sleeve can be firmly secured to the opening end of the grid cell.

Thus, in the present invention, a sleeve of such a type that a deflecting jig and a key member can be employed is used, and the sleeve can be secured to the grid cell perpendicular thereto without using any special tools. Furthermore, the securing strength of the sleeve can be increased as compared with the prior art grid in which the surface area for brazing is relatively small.

DESCRIPTION OF THE PREFERRED EMBODIMENTS OF THE INVENTION

Figure 1:
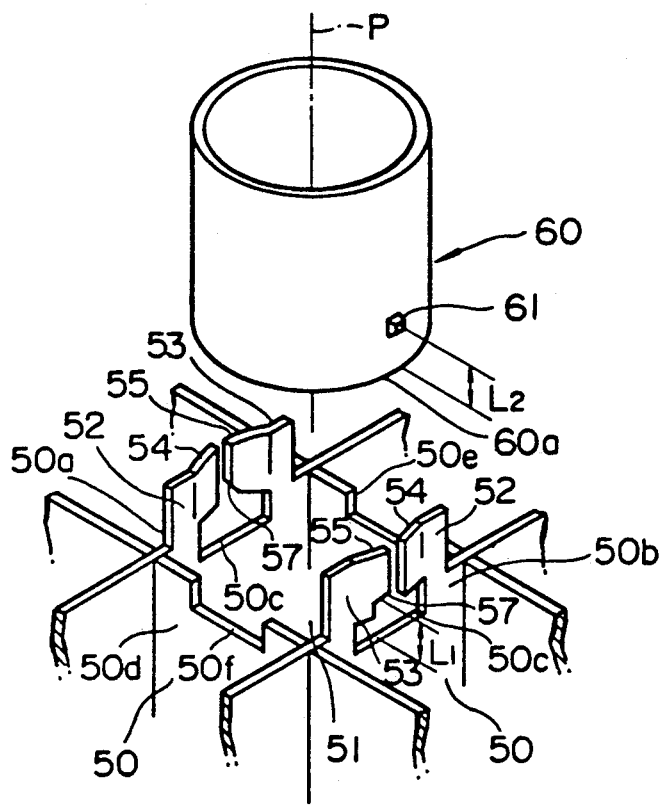
FIG. 1 is a fragmentary enlarged perspective view of a grid in accordance with a first embodiment of the present invention, but showing the state in which a short sleeve is not secured to a grid cell yet.
Figure 2:
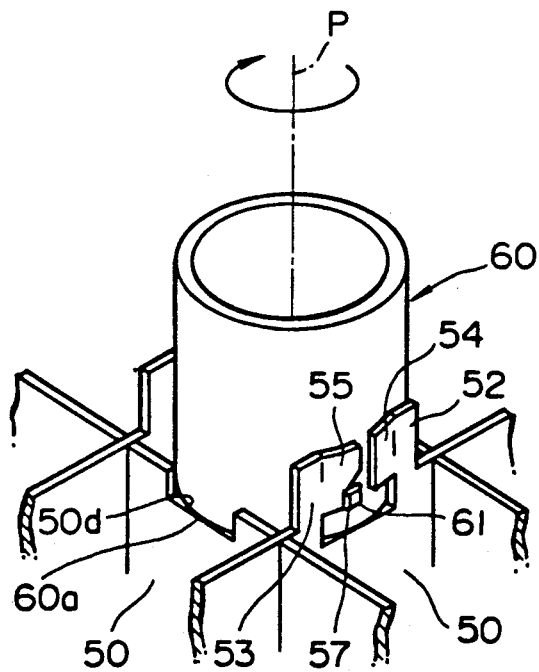
FIG. 2 is a view similar to FIG. 1, but showing the state in which the short sleeve is already secured to the grid cell.

Referring first to FIGS. 1 and 2, there is shown a grid for a nuclear fuel assembly in accordance with a first embodiment of the present invention.

Figure 9:
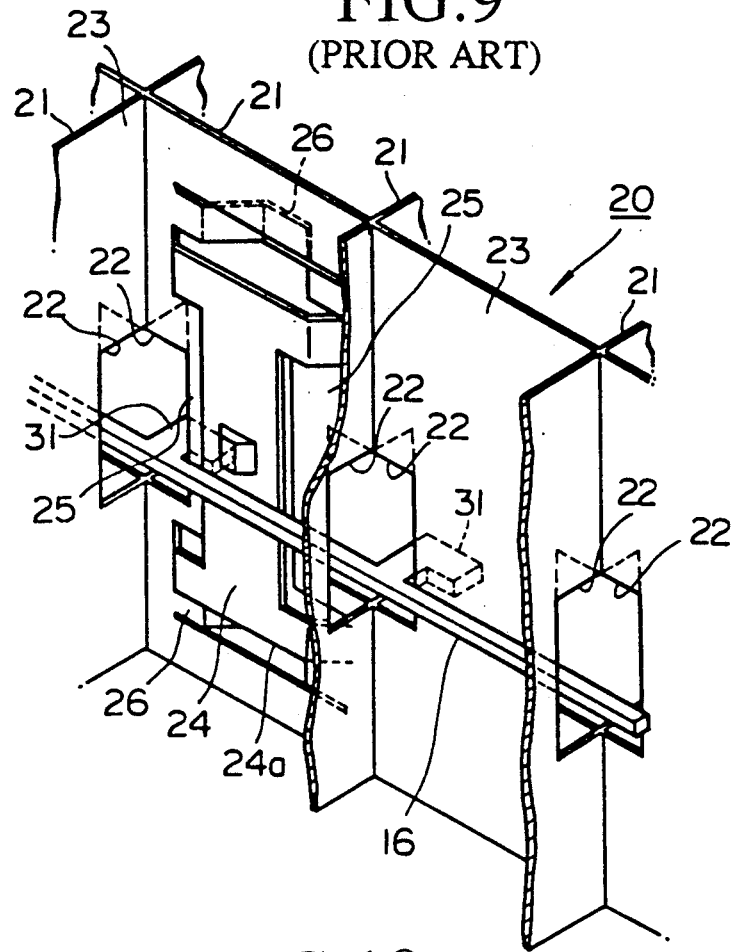
FIG. 9 is a fragmentary enlarged perspective view showing the inside of a modified prior art grid.
Figure 10:
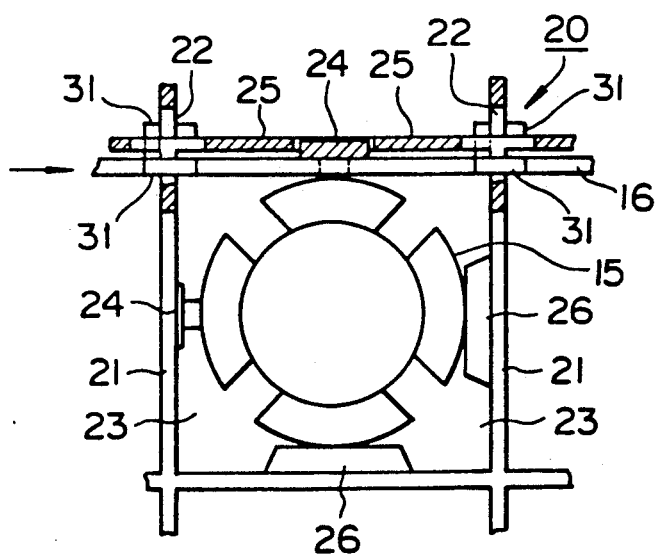
FIG. 10 is a top plan view of a grid cell of the grid of FIG. 9.
Figure 11:
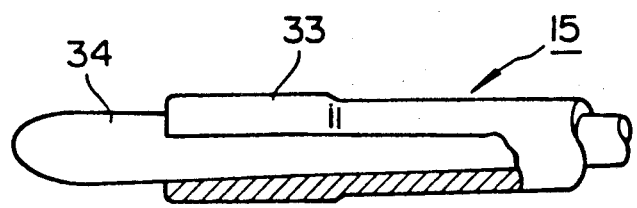
FIG. 11 is a partially cut-out perspective view of a deflecting jig.
Figure 12:
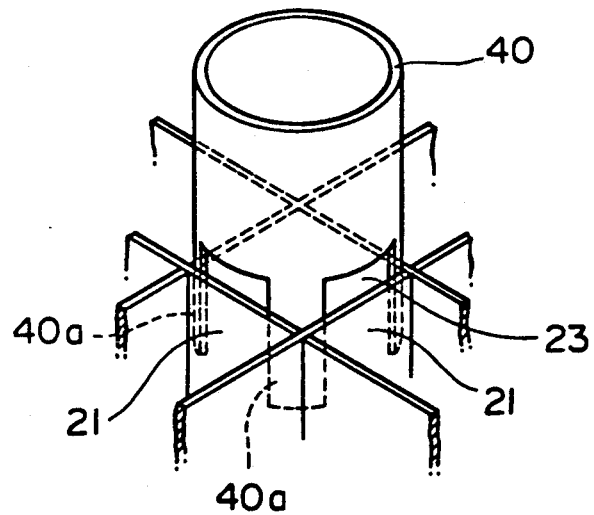
FIG. 12 is a perspective view showing a short sleeve secured to the grid.

The grid includes a plurality of elongated straps 50 of a strip sheet form assembled to each other to define a plurality of grid cells 51 which can be classified into first grid cells for supporting fuel rods and second grid cells for supporting thimbles. Although not shown, as is the case with the conventional grid shown in FIGS. 9 and 10, elongated cut-outs extending in a longitudinal direction of the straps 50 are formed in the wall portions of the straps 50, and a pair of dimples and a pair of springs for supporting the fuel rod are also formed thereon. Furthermore, each of the grid cells 51 has a prescribed intervening distance defined between the opposed wall portions of the straps 50, and those portions of the straps 50 defining a respective grid cell 51 have opposite ends defining opposite opening ends of the grid cell 51.

The grid includes a plurality of engaging means each provided on a respective one of the second grid cells 51, and each engaging means includes two pairs of engaging members 52 and 53 extending upwardly from the grid cell 51 so as to be flush therewith. The pairs of engaging members 52 and 53 are formed on the opposed wall portions 50a and 50b of the grid cell 51, respectively, and each pair of engaging members 42 and 53 are formed on a respective wall portion in a longitudinally spaced relation to each other with respect to the strap to define a vertically-extending extending elongated gap therebetween and include sliding portions 54 and 55 defining sliding surfaces. The sliding surfaces of the sliding portions 54 and 55 define a curved shape protruding slightly outwardly from the grid cell 51, and the lower end of one of the pair of sliding portions is removed in an oblique manner to provide a cut-out portion 57 which cooperates with the elongated gap to define a sleeve-engaging portion. In addition, that portion of the strap located under the pair of sliding portions is removed to provide a bearing end face 50c facing upwardly. With these constructions, each pair of engaging members 52 and 53 are of such shapes as to exert a prescribed resilient force in a direction toward the opposed pair of engaging members.

Furthermore, the ends of the other opposed wall portions 50d and 50e are removed to provide bearing end faces 50f in such a manner as to have a height identical to that of the end faces 50c. In addition, the distance between the cut-out 57 of the sliding portion 55 and the end face 50c is set to a prescribed length $L_1$.

Moreover, the grid includes a plurality of short cylindrical sleeves 60 each having an axis P therethrough and an inner diameter generally identical to the intervening distance between the opposite straps of the grid cell 51. Each sleeve 60 is provided with a pair of projections 61 formed thereon in diametrically opposite relation to each other, and the length $L_2$ between the projection 61 and the bottom 60a of the sleeve 60 is set so as to be identical to the length $L_1$ between the cut-out and the end face 50c.

When securing the short sleeve 60 to either the upper or lower opening end of the grid cell 51, the short sleeve 60 is first inserted therein in such a manner that the projection 61 is moved between a respective pair of engaging members 52 and 53, until the bottom 60a is brought into abutting contact with the end faces 50c and 50f of the straps 50. Thereafter, the sleeve is caused to rotate about its axis P. Thus, the engaging members 52 and 53 are elastically deformed outwardly from the grid cell 51, and as shown in FIG. 2, the projection 61 of the short sleeve 60 is fitted in the cut-out 57 of the sliding portion 55.

Thus, the short sleeve 60 can be firmly secured to the opening end of the grid cell 51. In addition, since the bottom 60a is held in abutment with the end faces 50c and 50f of the straps 50, the short sleeve 60 can be arranged exactly perpendicularly to the grid.

Figure 3:
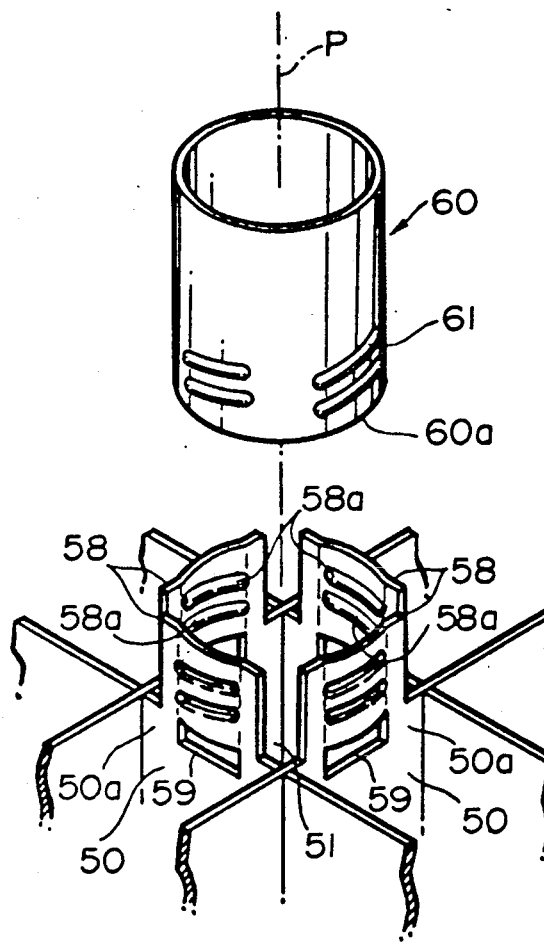
FIG. 3 is a view similar to FIG. 1, but showing a grid in accordance with a second embodiment of the invention.
Figure 4:
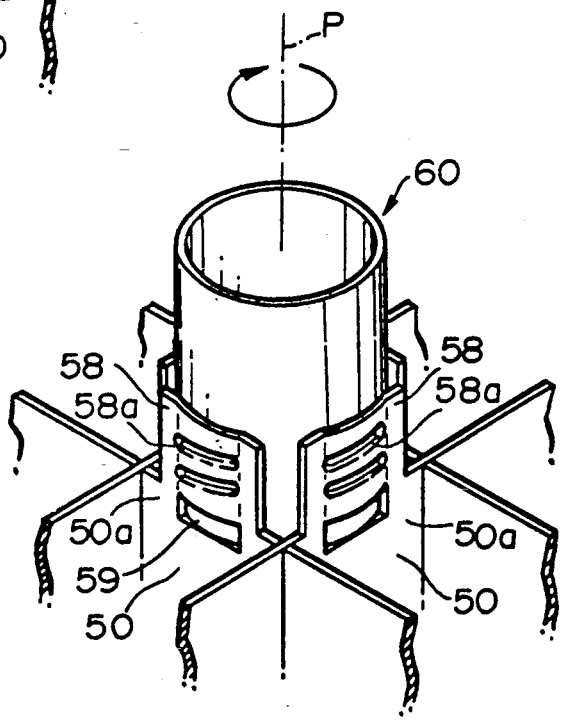
FIG. 4 is a view similar to FIG. 3, but sowing the state in which the short sleeve is already secured to the grid cell.
Figure 5:
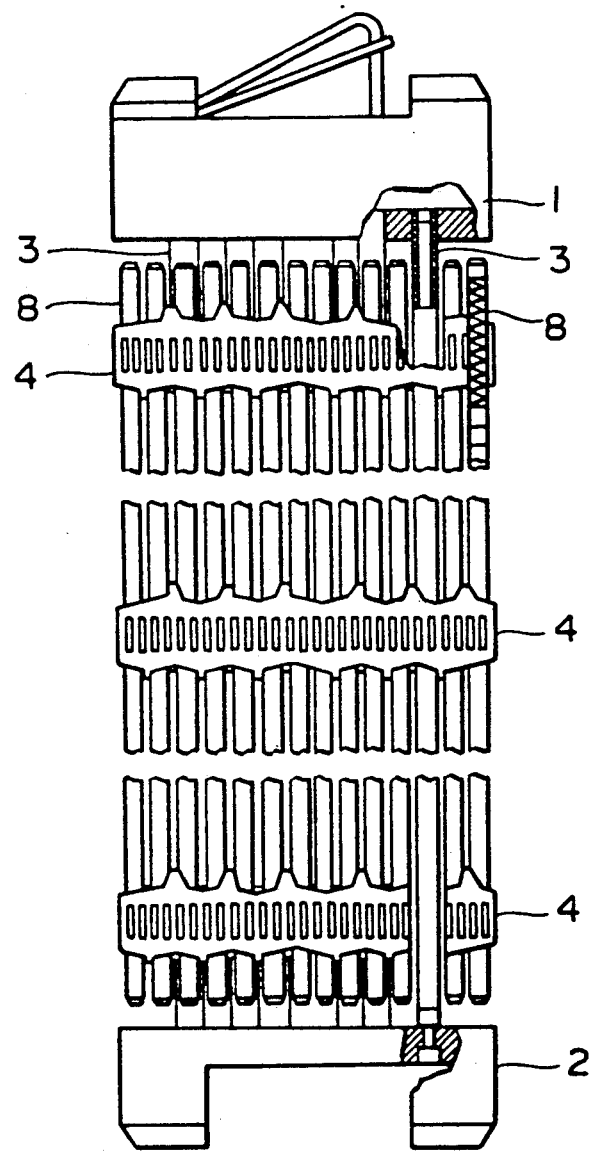
FIG. 5 is a front elevational view of a nuclear fuel assembly for a pressurized water reactor.
Figure 6:
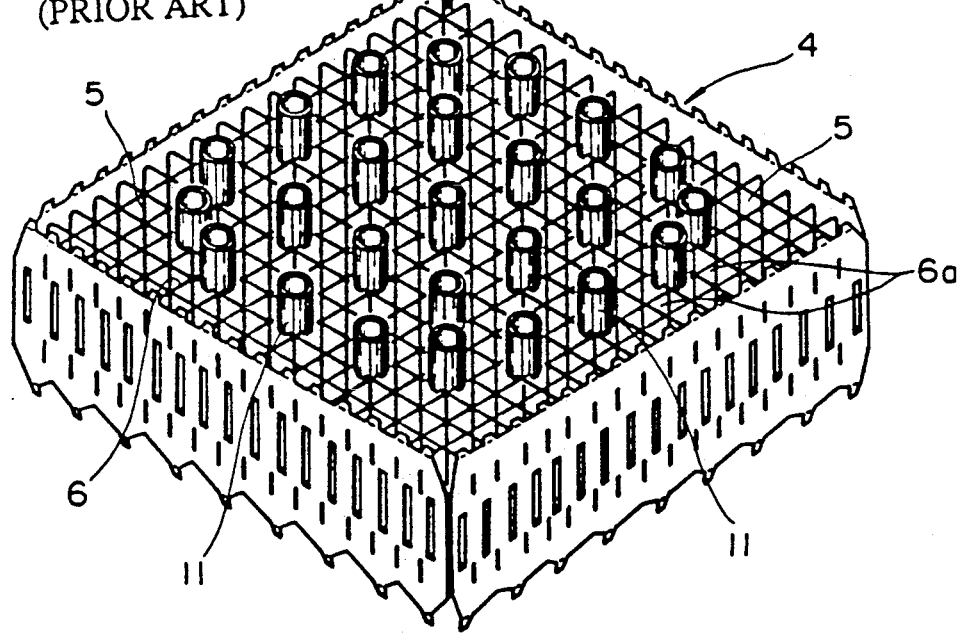
FIG. 6 is a perspective view of a conventional grid.
Figure 7:
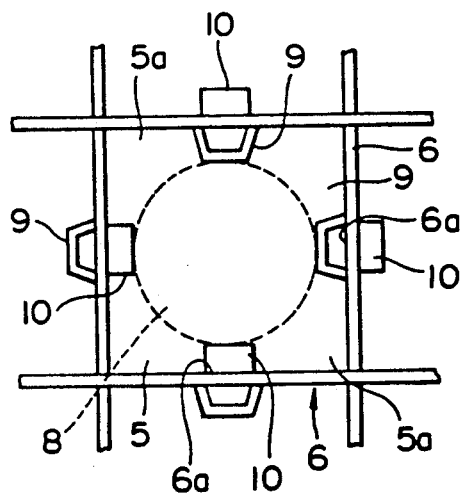
FIG. 7 is a top plan view of the grid cell of the grid in FIG. 6.
Figure 8:
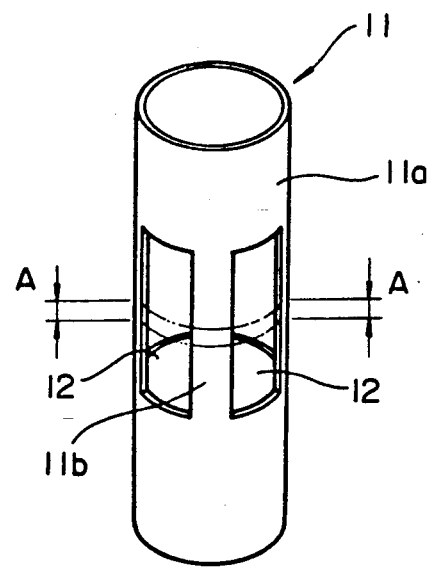
FIG. 8 is a perspective view of a conventional sleeve.

FIGS. 3 and 4 depict a grid in accordance with a second embodiment of the invention, in which the same reference numerals are used to designate the parts common with the previous embodiment to omit their descriptions. In this embodiment, the engaging means includes four plate-like engaging members 58 extending upwardly from the wall portions 50a of the straps 50 defining the grid cell 51. Each engaging member 58 is formed into such a curved shape that its central portion protrudes outwardly from the grid cell 51, and includes a plurality of elongated projections projecting inwardly of the grid cell 51. The projections 58a are slightly inclined in a widthwise direction of the engaging member 58, and define one or more grooves therebetween. All of the projections 58a are formed so that the four engaging members are identical in structure to one another. Furthermore, as is the case with the previous embodiment, the wall portion 50a of each strap has an opening formed under a respective engaging member 58 and defining a bearing end face 59.

Moreover, a plurality of elongated engaging projections 61 are formed on that portion of the outer peripheral surface of the sleeve 60 which is formed in the grid cell 51. The projections 61 are formed so as to be complementary to the grooves formed on the engaging members.

In the grid as described above, when securing the short sleeve 61 on either one of the upper or lower opening end of the grid cell 51, the short sleeve 60 is inserted among the four engaging members 58 on the strap 50 until the bottom 60a is brought into abutment with the end faces 59 of the strap 50, and then is rotated about its axis P to screw-fit the sleeve 60 in the engaging members 58. In the foregoing, the engaging members 58 are elastically deformed in an outward direction from the grid cell 51, and hence the projection 61 of the short sleeve 60 are sandwiched among and fitted in the elongated projections 58a as illustrated in FIG. 4.

Thus, when the short sleeve 60 is inserted among the engaging members and rotated about the axis P, the engaging projection 61 are caused to fit in the grooves between the protrusions 58a of the engaging members 58, so that the short sleeve 60 can be firmly secured to the opening end of the grid cell 51. Furthermore, since the bottom 60a is held in contact with the end faces 59 of the strap 50, the short sleeve 60 can be disposed perpendicular to the grid.

Obviously many modifications and variations of the present invention are possible in the light of the above teachings. It is therefore to be understood that within the scope of the appended claims, the invention may be practiced otherwise than as specifically described.

What is claimed is:

1. A grid in a nuclear fuel assembly for supporting fuel rods and thimbles, comprising:
   a plurality of elongated straps intersecting perpendicularly with each other to define a plurality of first grid cells for supporting the fuel rods and a plurality of second grid cells for supporting the thimbles, each of said grid cells having a prescribed intervening distance defined between a pair of the opposed straps, those portions of said straps defining a respective one of said grid cells having opposite ends defining opposite opening ends of said respective grid cell;
   a plurality of engaging means each provided on a respective one of said second grid cells, each of said engaging means including at least one engaging member provided on at least one of said opposite ends of said straps of said second grid cell and defining an engaging portion; and
   a plurality of cylindrical sleeves each arranged in a respective one of said second grid cells and having an inner diameter generally identical to said intervening distance, each of said sleeves having at least one engaging projection associated with said engaging portion of said engaging member, said engaging projection of said sleeve and said engaging portion of said engaging member being formed such that when said sleeve is turned circumferentially, said engaging projection is held in engagement with said engaging portion.

2. A grid according to claim 1, in which those portions of said straps defining a respective one of said second grid cells have openings defining bearing faces on which said sleeve is received.

3. A grid according to claim 2, in which said engaging member has a curved face which is concentric with an outer curved surface of said sleeve and which receives said sleeve in a form-fitting relationship.

4. A grid according to claim 3, in which said engaging portion is defined by an elongated engaging opening generally extending circumferentially of said sleeve.

5. A grid according to claim 4, in which each of said engaging means includes at least one pair of said engaging members formed on at least one of said portions of said straps defining a respective second grid cell, said pair of engaging members being spaced longitudinally of said strap to define an elongated gap extending longitudinally of said sleeve, one of said pair of engaging members having a cut-one portion which cooperates with said elongated gap to define said engaging opening.

6. A grid according to claim 4, wherein said engaging members are formed on said portions of said straps defining a respective second grid cell, respectively, each of said engaging members having a plurality of elongated protrusions spaced longitudinally of said sleeve to define one or more grooves therebetween, said grooves of said engaging members cooperating with each other to serve said engaging opening, said sleeve having a plurality of said engaging projections formed on an outer peripheral surface thereof so as to be complementary to said grooves on said engaging members.

7. A grid according to claim 1, wherein:
   each of said cylindrical sleeves terminates at an axial bottom, and wherein said axial bottom is held in abutment with one of said opposite ends of said strap portions when said engaging projection is held in engagement with said engaging portion.

8. A grid according to claim 7, wherein:
   said engaging portions do not extend to the other of said opposite ends.

* * * * *

UNITED STATES PATENT AND TRADEMARK OFFICE
CERTIFICATE OF CORRECTION

PATENT NO. : 5,133,927
DATED : July 28, 1992
INVENTOR(S) : Hiroaki Kadono et al.

It is certified that error appears in the above-identified patent and that said Letters Patent is hereby corrected as shown below:

The first inventor's name is spelled incorrectly, should be,

--Hiroaki Kadono--.

Signed and Sealed this

Twenty-fourth Day of August, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,133,927

DATED : July 28, 1992

INVENTOR(S) : Hiroaki Kadono et al.

It is certified that error appears in the above-identified patent and that said Letters Patent is hereby corrected as shown below:

On the Title Page,

Item [75], the inventor's information is incorrect, should be,

--Hiroaki Kadono; Akio Oriuchi; Koichi Tominaga, all of Ibaraki, Japan--.

Signed and Sealed this

Seventh Day of September, 1993

*Attest:*

BRUCE LEHMAN

*Attesting Officer*   *Commissioner of Patents and Trademarks*